United States Patent
Yu

(10) Patent No.: US 12,189,935 B2
(45) Date of Patent: Jan. 7, 2025

(54) METHOD AND APPARATUS FOR DISPLAYING A WIDGET, STORAGE MEDIUM, AND CHIP

(71) Applicant: Beijing Xiaomi Mobile Software Co., Ltd., Beijing (CN)

(72) Inventor: Tingxue Yu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 18/309,725

(22) Filed: Apr. 28, 2023

(65) Prior Publication Data
US 2024/0152262 A1    May 9, 2024

(30) Foreign Application Priority Data

Nov. 9, 2022  (CN) .......................... 202211400548.6

(51) Int. Cl.
| | | |
|---|---|---|
| *G06F 3/04845* | (2022.01) | |
| *G06F 3/04847* | (2022.01) | |
| *H04M 1/724* | (2021.01) | |
| *G06Q 10/08* | (2023.01) | |

(52) U.S. Cl.
CPC ...... *G06F 3/04847* (2013.01); *G06F 3/04845* (2013.01); *H04M 1/724* (2021.01); *G06Q 10/08* (2013.01)

(58) Field of Classification Search
None
See application file for complete search history.

(56) References Cited

U.S. PATENT DOCUMENTS

| | | |
|---|---|---|
| 2006/0015818 A1 | 1/2006 | Chaudhri et al. |
| 2008/0082930 A1* | 4/2008 | Omernick ............. G06F 1/1684 715/765 |
| 2013/0293590 A1* | 11/2013 | Gommier ............... G09G 5/373 345/666 |
| 2015/0346957 A1* | 12/2015 | Louch ................. G06F 3/04842 715/765 |
| 2016/0048283 A1 | 2/2016 | Yang et al. |
| 2018/0302231 A1* | 10/2018 | Sung ....................... H04L 51/04 |

FOREIGN PATENT DOCUMENTS

WO    2022/152024 A1    7/2022

OTHER PUBLICATIONS

WO2022152024A1 (English Translation) "Widget Display Method and Electronic Device" Published on Jul. 21, 2022 by Zhang et al.*
Extended European Search Report issued on Oct. 11, 2023 for European Patent Application No. 23170621.9.

* cited by examiner

*Primary Examiner* — Rinna Yi
(74) *Attorney, Agent, or Firm* — Volpe Koenig

(57) ABSTRACT

A method for displaying a widget. The widget is displayed by first detecting scene information of a terminal device, obtaining a first display content of the widget corresponding to the changed scene information the scene information is changed, and then updating a display content of the widget from a second display content currently displayed to the first display content.

19 Claims, 16 Drawing Sheets

METHOD AND APPARATUS FOR DISPLAYING A WIDGET, STORAGE MEDIUM, AND CHIP

CROSS REFERENCE TO RELATED APPLICATION

The present application claims the benefit of priority to Chinese Application No. 202211400548.6, filed on Nov. 9, 2022, the contents of which are incorporated herein by reference in their entireties for all purposes.

BACKGROUND

A desktop widget, also known as a web widget or a gadget, is a lightweight presentation of application information, and has the characteristics of beauty, personalization, etc.

SUMMARY

The disclosure provides a method and apparatus for displaying a widget, a storage medium, and a chip.

According to a first aspect of the examples of the disclosure, provided is a method for displaying a widget performed by a terminal device, where the method includes:
detecting scene information of the terminal device;
obtaining a first display content corresponding to changed scene information the scene information is changed; and
updating a display content of the widget from a second display content currently displayed to the first display content.

According to a second aspect of the examples of the disclosure, provided is an apparatus for displaying a widget, including:
a processor; and
a memory, configured to store processor executable instructions;
where the processor is configured to implement the steps of any one of the methods in the first aspect of the disclosure when executing the executable instructions.

According to a third aspect of the examples of the disclosure, provided is a non-transitory computer readable storage medium having computer program instructions stored, where when the program instructions are executed by a processor, the steps of the method for displaying a widget provided in the first aspect of the disclosure are implemented.

It should be understood that the above general description and the following detailed description are merely illustrative and explanatory, and are not intended to limit the disclosure.

BRIEF DESCRIPTION OF THE DRAWINGS

The accompanying drawings here are incorporated into and constitute part of the description, illustrate the examples conforming to the disclosure, and are used together with the description to interpret the principles of the disclosure.

DETAILED DESCRIPTION

Examples will be described in detail here, instances of which are shown in the accompanying drawings. When the following description involves drawings, the same numbers in different drawings represent the same or similar elements unless otherwise indicated. The implementations described in the following examples do not represent all implementations consistent with the disclosure. On the contrary, they are only instances of devices and methods consistent with some aspects of the disclosure as detailed in the appended claims.

It should be noted that all actions of obtaining signals, information or data in this application are performed under the premise of complying with the corresponding data protection regulations and policies of the country of the locality and with the authorization given by the corresponding device owner.

The disclosure relates to the field of user interfaces, in particular to a method and apparatus for displaying a widget, a storage medium, and a chip.

In the related art, a presentation content of the widget is relatively fixed, a same widget presents a same content for a long time after being added to a desktop, the efficiency of information transmission is low, and it is difficult to meet the needs of users to obtain information in a plurality of scenes.

Figure 1:
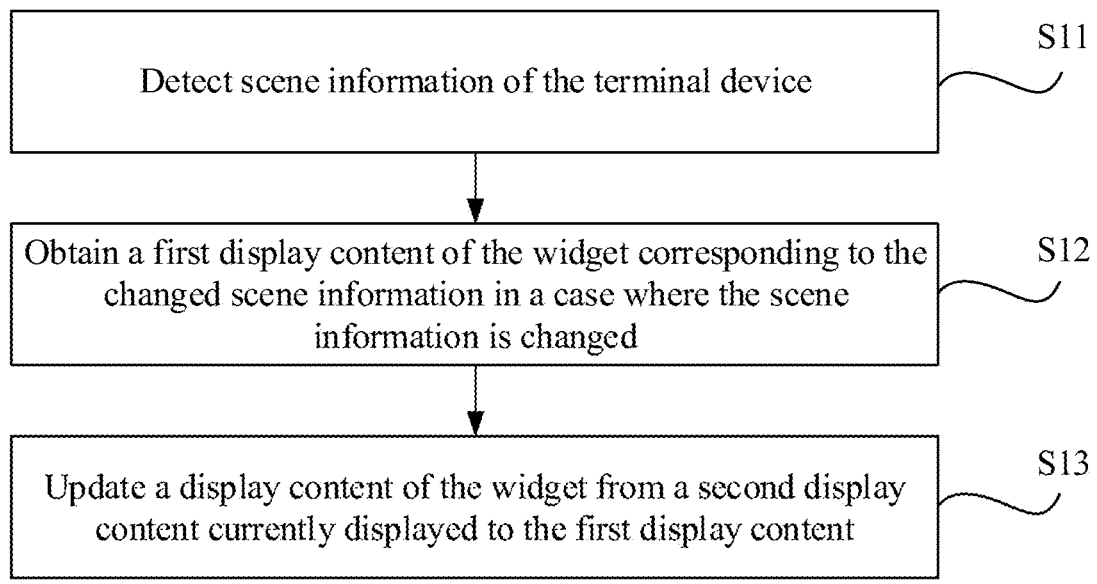
FIG. 1 is a flow chart of a method for displaying a widget according to an example.

FIG. 1 is a flow chart of a method for displaying a widget according to an example, and as shown in FIG. 1, the method is performed by a terminal device, and includes the following steps.

In step S11, scene information of the terminal device is detected.

For example, the scene information of the terminal device may include a current time, location, weather, and the like, and by detecting the scene information of the terminal device, whether a scene in which the terminal device is located changes can be determined, so that a display content of a corresponding widget is also different in different scenes.

In step S12, the scene information is changed, a first display content corresponding to the changed scene information is obtained.

It is understandable that the widget in the examples of the disclosure may be a self-contained widget of an operating system or a widget provided by application programs (APPs) with different functions, so different widgets may have different display contents, for example, a weather widget is configured to display weather, and a to-do widget is configured to display a to-do list.

In step S13, a display content of the widget is updated from a second display content currently displayed to the first display content.

For example, when the scene information is changed, the currently displayed content of the widget is updated to change the display content of the widget to the display content corresponding to the changed scene information, e.g., for the weather widget, the second display content currently displayed may be weather information on the same day, and the first display content may be weather information on the next day, or may be weather information on future several days.

In the above technical solution, the scene information of the terminal device is first detected, the first display content of the widget corresponding to the changed scene information is obtained in the case where the scene information is changed, and then the display content of the widget is updated from the second display content currently displayed to the first display content. With the above-described implementations, the display content of the widget can be changed in different scenes, the diversity and flexibility of the display content of the widget can be increased, the efficiency of information transmission can be increased, and the needs of users to obtain information in a plurality of scenes can be met.

Figure 2:
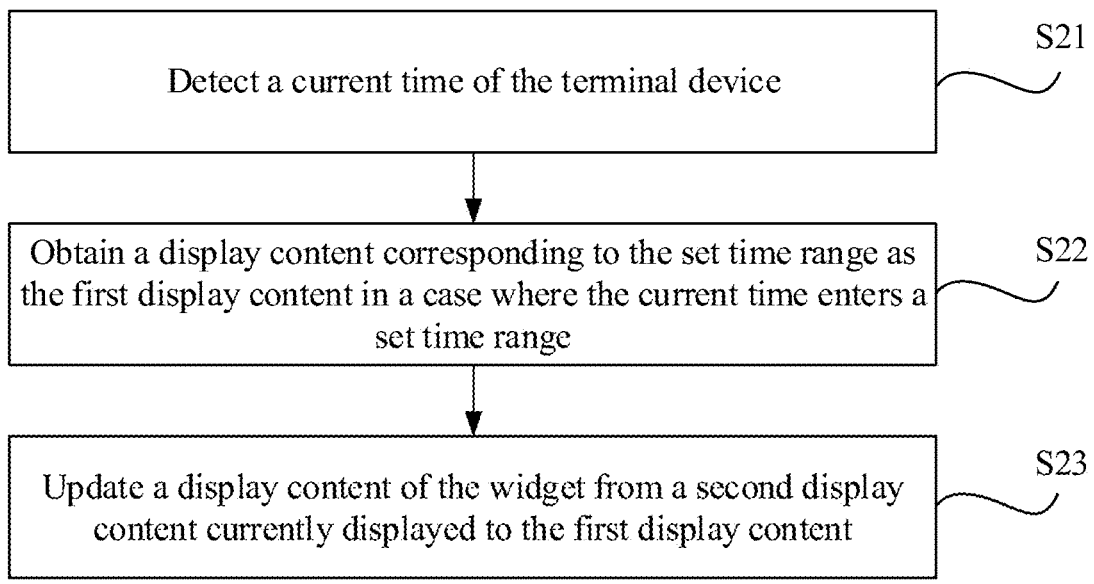
FIG. 2 is a flow chart of a method for displaying a widget according to another example.

FIG. 2 is a flow chart of a method for displaying a widget according to another example. As shown in FIG. 2, the scene information is a current time, and the method for displaying a widget may include:

step S21, the current time of the terminal device is detected.

Accordingly, the scene information is the current time, detecting whether the scene information is changed may detect whether the current time enters a set time range. Thus, in the case where the scene information is the current time, the step S12 of obtaining the first display content of the widget corresponding to the changed scene information in the case where the scene information is changed may be performed according to Step S22.

In step S22, the current time enters a set time range, a display content corresponding to the set time range is obtained as the first display content.

The display content corresponding to the set time range may be pre-set.

In step S23, a display content of the widget is updated from a second display content currently displayed to the first display content.

In some examples, the widget is a weather widget, the step S22 of obtaining the display content corresponding to the set time range as the first display content in the case where the current time enters the set time range may include:

the current time enters the set time range, weather information within a future set time is obtained as the first display content.

For example, in one possible implementation, the scene information is a current time, the widget is a weather widget, and the set time range may be from 10:00 p.m. on the same day to 10:00 p.m. on the next day (which can be understood as 22:00 on the same day to 21:59 on the next day). Before 10:00 p.m. on the same day, the widget displays the weather on the same day by default, and after reaching 10:00 p.m., the widget displays a weather forecast within a future set time. The terminal device may obtain the current time in real time, and determine whether the current time reaches 10:00 p.m., and when it is determined that the current time reaches 10:00 p.m., a display content of the weather widget is updated to the weather information within the future set time.

Figure 3A:
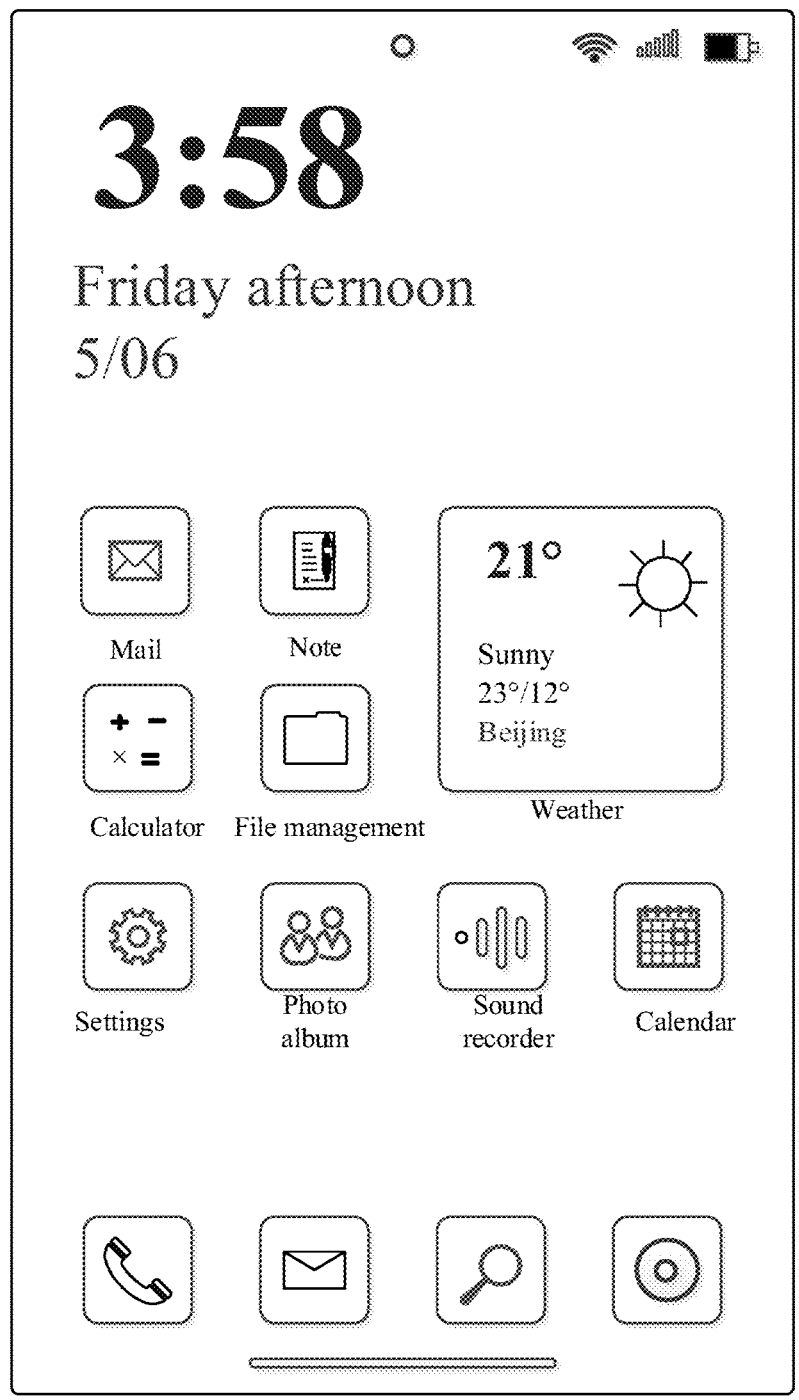
FIG. 3A is a diagram of a user interface according to an example.
Figure 3B:
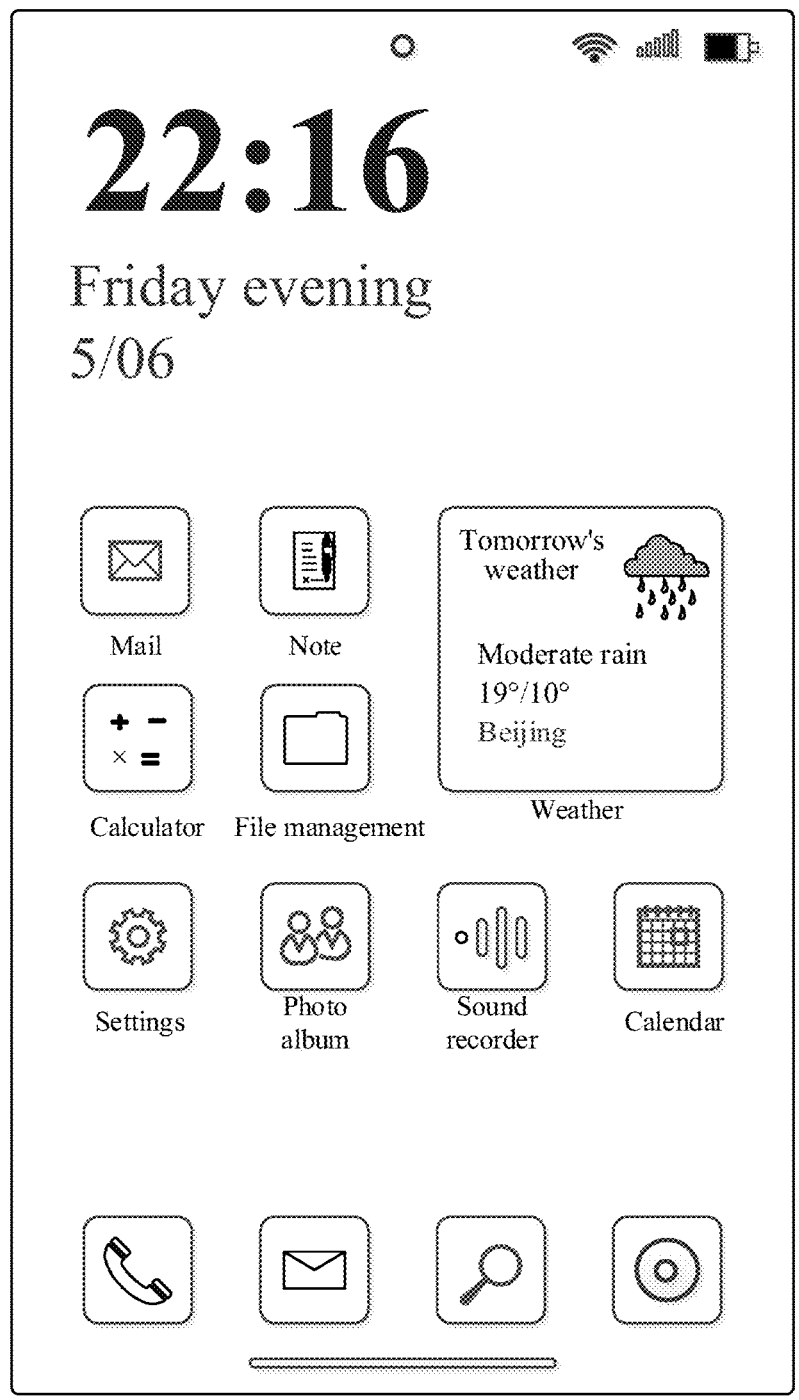
FIG. 3B is a diagram of another user interface according to an example.

Taking FIG. 3A and FIG. 3B as an example, FIG. 3A is a diagram of a user interface according to an example, as shown in FIG. 3A, the current time is 3:58 p.m. on May 6, and the display content of the weather widget is current weather: sunny, with an air temperature of 21° (the air temperature unit in the examples of the disclosure is degrees Celsius).

FIG. 3B is a diagram of another user interface according to an example, as shown in FIG. 3B, the display content of the weather widget is tomorrow's weather forecast: moderate rain, with an air temperature of 10°-19° when the current time is 10:16 p.m. on May 6. Displaying the weather forecast within the future set time may be displaying a weather forecast on the next day, or may be displaying a weather forecast on next several days, such as a weather forecast on next three days, or a weather forecast on next five days. It is worth mentioning that the specific number of days of the future set time needs to be determined according to a display size of the weather widget on a desktop, and the display size may be set by a user. It can be understood that the larger the display size, the more days the widget may display the weather forecast.

Figure 3C:
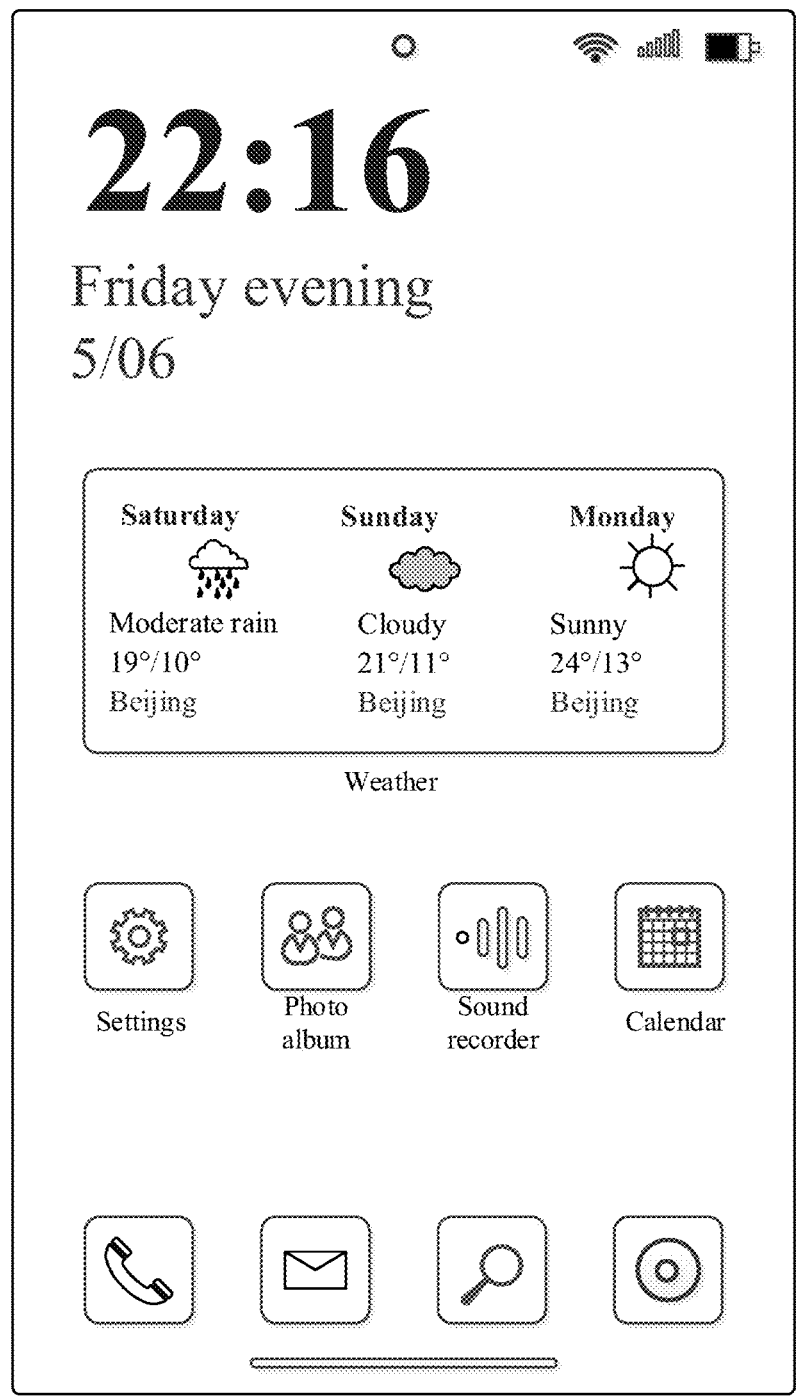
FIG. 3C is a diagram of yet another user interface according to an example.

FIG. 3C is a diagram of yet another user interface according to an example, as shown in FIG. 3C, when the weather widget is larger in size, after 10:00 p.m. on Friday, the display content may be a weather forecast on next three days: moderate rain on Saturday, with an air temperature of 10°~19°; cloudy on Sunday, with an air temperature of 11°~21°; sunny on Monday, with an air temperature of 13°~24°.

In some examples, in another implementation, the widget is a to-do widget, the step S22 of obtaining the display content corresponding to the set time range as the first display content in the case where the current time enters the set time range may include:

in the case where the current time enters the set time range, obtaining a first number of to-do events within a future set time as the first display content, where the first number is determined according to a size of the widget.

For example, the set time range is set to be after 10:00 p.m. (which can be understood as 22:00 on the same day to 21:59 on the next day), the first number, i.e., the number of future to-do events displayed by the to-do widget, may be set according to the size of the widget, e.g., it may be set to display tomorrow's to-do events, or to-do events on next three days.

Figure 4:
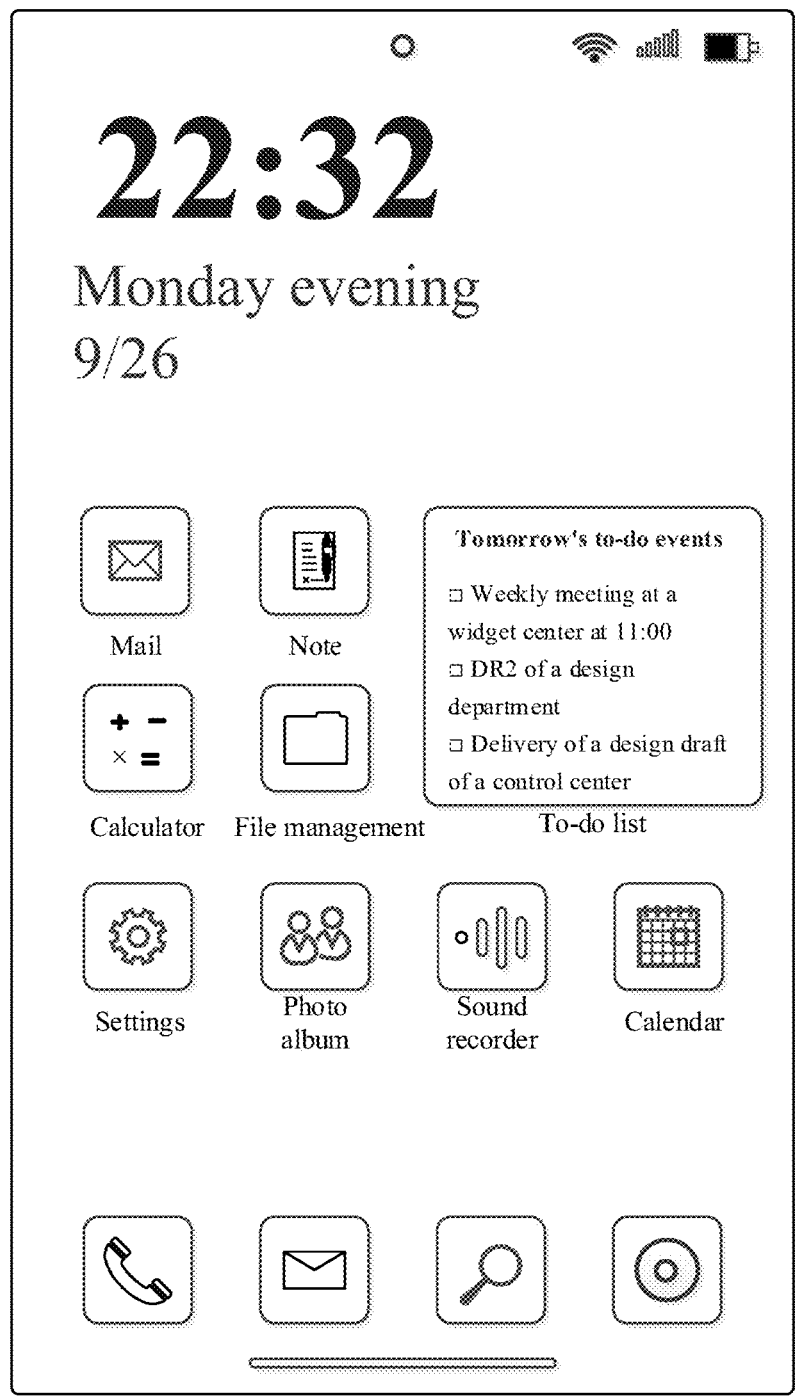
FIG. 4 is a diagram of a user interface according to an example.

FIG. 4 is a diagram of a user interface according to an example, as shown in FIG. 4, at 10:32 p.m. on Monday, the to-do widget displays tomorrow's to-do events: delivery of a design draft of a control center, DR2 of a design department, and weekly meeting at a widget center at 11:00. If the actual number of to-do events in a to-do App is greater than 3, three to-do events with the earliest deadline in the to-do events may be displayed on the to-do widget.

Further, in another implementation, the scene information is a current time, and the widget is a to-do widget, the step S12 of obtaining the first display content of the widget corresponding to the changed scene information in the case where the scene information is changed may include:

performing visual style enhancement processing on reminding information of the first to-do event in a case where a time difference between the current time and a target time of a first to-do event in the to-do widget is less than a set time difference to obtain visual style enhanced reminding information as the first display content; where the first to-do event is a to-do event in the to-do widget.

For example, when a certain to-do event approaches the deadline, this to-do event may be highlighted on a display interface of the to-do widget. For example, a time difference near the deadline may be set to be 20 minutes, and in a case where a time difference between a current time and a target time of a to-do event is 20 minutes, the to-do event is subjected to visual style enhancement processing such as displaying at the top, font enlarging, and color changing (for example, the color can be changed to a brighter color).

Figure 5:
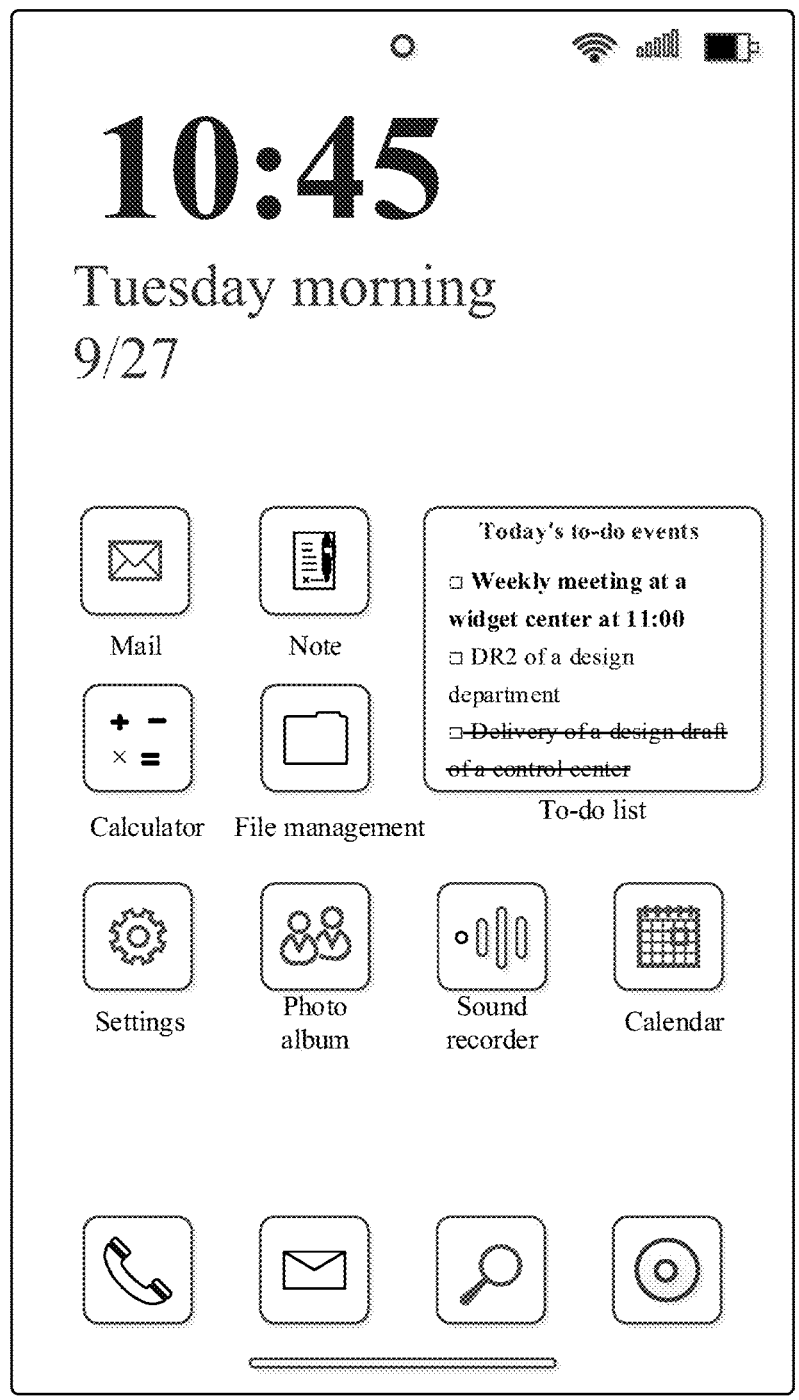
FIG. 5 is a diagram of a user interface according to an example.

FIG. 5 is a diagram of a user interface according to an example, as shown in FIG. 5, when a current time is 10:45 a.m., there are still 15 minutes away from a to-do event "weekly meeting at widget center at 11:00", which is less than the set 20 minutes, and at this time, the to-do widget displays the to-do event "weekly meeting at a widget center at 11:00" at the top in an enlarged font.

Figure 6:
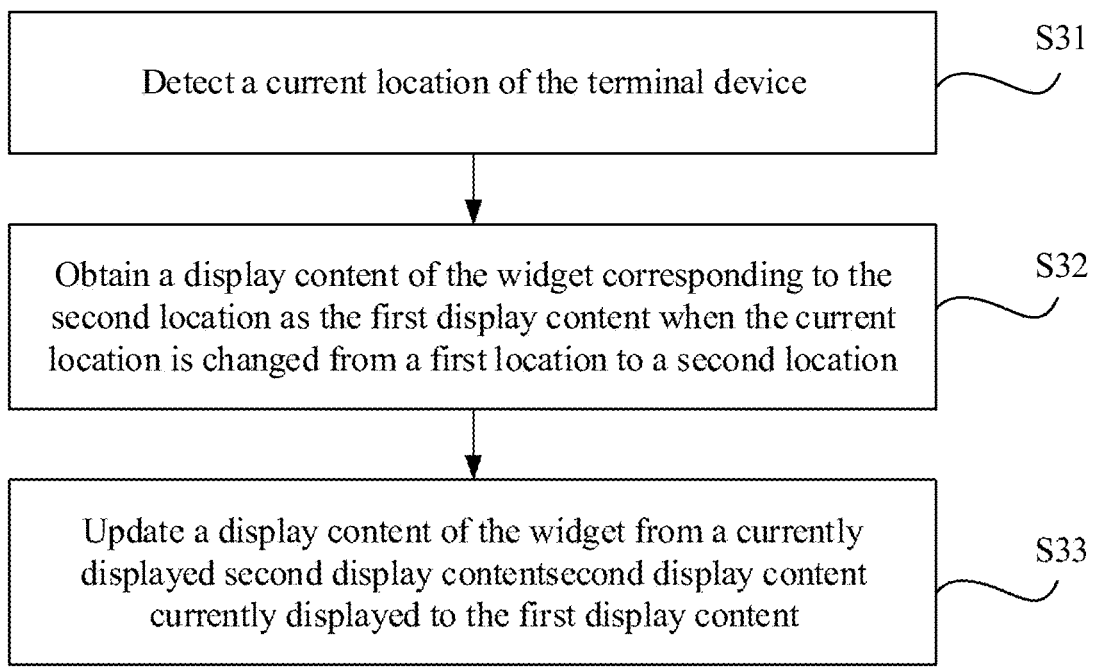
FIG. 6 is a flow chart of a method for displaying a widget according to another example.

FIG. 6 is a flow chart of a method for displaying a widget according to another example, as shown in FIG. 6, the scene information is a current location, obtaining the first display content of the widget corresponding to the changed scene information in the case where the scene information is changed in the method for displaying a widget may include:

step S31, a current location of the terminal device is detected.

Accordingly, in the case where the scene information is the current location, detecting whether the scene information is changed may detect whether the current location is changed from a first location to a second location. Thus, in the case where the scene information is the current location, the step S12 of obtaining the first display content of the widget corresponding to the changed scene information in the case where the scene information is changed may be performed according to step S32.

In step S32, when the current location is changed from a first location to a second location, a display content of the widget corresponding to the second location is obtained as the first display content. The display content corresponding to the second location may be pre-set.

In step S33, a display content of the widget is updated from a second display content currently displayed to the first display content.

In some examples, in one implementation, the widget is a weather widget, the above step S32 may include:

obtaining weather information of a region to which the second location belongs as the first display content when the current location is changed from the first location to the second location.

It can be understood that the current location may be a current geographical location, such as latitude and longitude coordinates, the terminal device may monitor its geographical location in real time, for example, when a location of the terminal device changes, a display content of the weather widget changes accordingly, for example, when the city changes from Beijing to Nanjing, the weather widget displays the weather in Nanjing. Or, when the location of the terminal device changes, it is identified whether the terminal device is located at a home or in an office, and a to-do event displayed by the to-do widget changes accordingly to a to-do event corresponding to the home or office.

Figure 7:
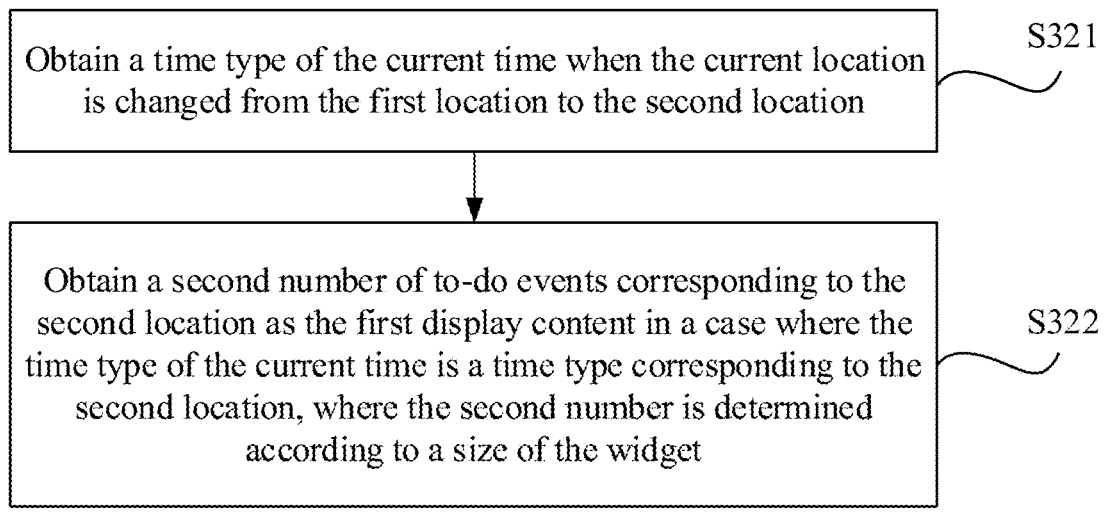
FIG. 7 is a flow chart of a method for displaying a widget according to an example.

FIG. 7 is a flow chart of a method for displaying a widget according to an example, as shown in FIG. 7, when the widget is a to-do widget, the step S32 of obtaining the display content of the widget corresponding to the second location as the first display content when the current location is changed from the first location to the second location may include:

step S321, a time type of the current time is obtained when the current location is changed from the first location to the second location; and step S322, the time type of the current time is a time type corresponding to the second location, a second number of to-do events corresponding to the second location is obtained as the first display content, where the second number is determined according to a size of the widget.

Further, the step S322 may include:

obtaining a second number of work to-do events with a highest priority among work to-do events as the first display content in a case where a place to which the second location corresponds is an office place, and the current time is a working day; and obtaining a second number of life to-do events with a highest priority among life to-do events as the first display content in a case where a place to which the second location corresponds is a home, and the current time is a rest day.

Figure 8A:
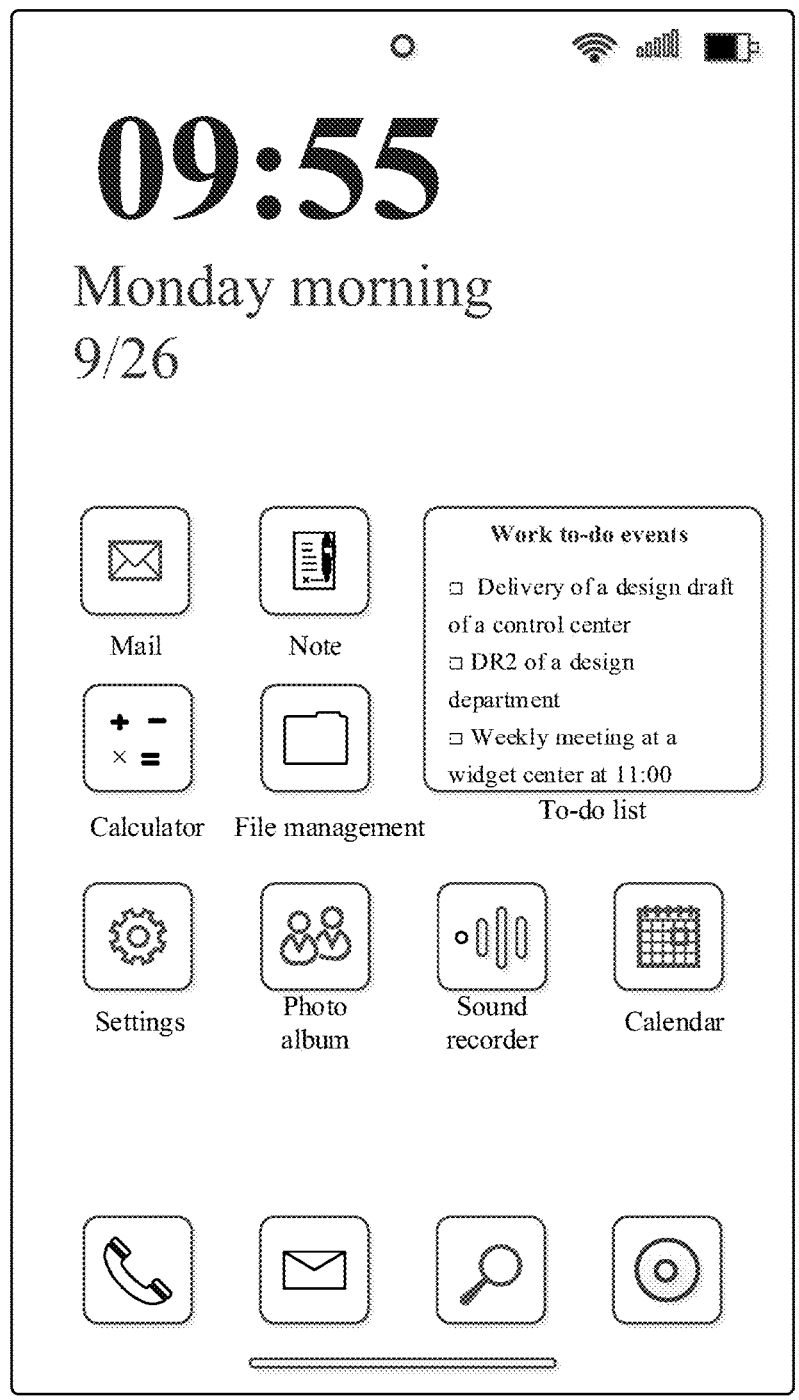
FIG. 8A is a diagram of a user interface according to an example.

FIG. 8A is a diagram of a user interface according to an example, as shown in FIG. 8A, the terminal device is located in a company at this time, and the current time is 9:55 a.m. on Monday, and a display content of the to-do widget is work to-do events: delivery of a design draft of a control center, DR2 of a design department, and weekly meeting at a widget center at 11:00.

Figure 8B:
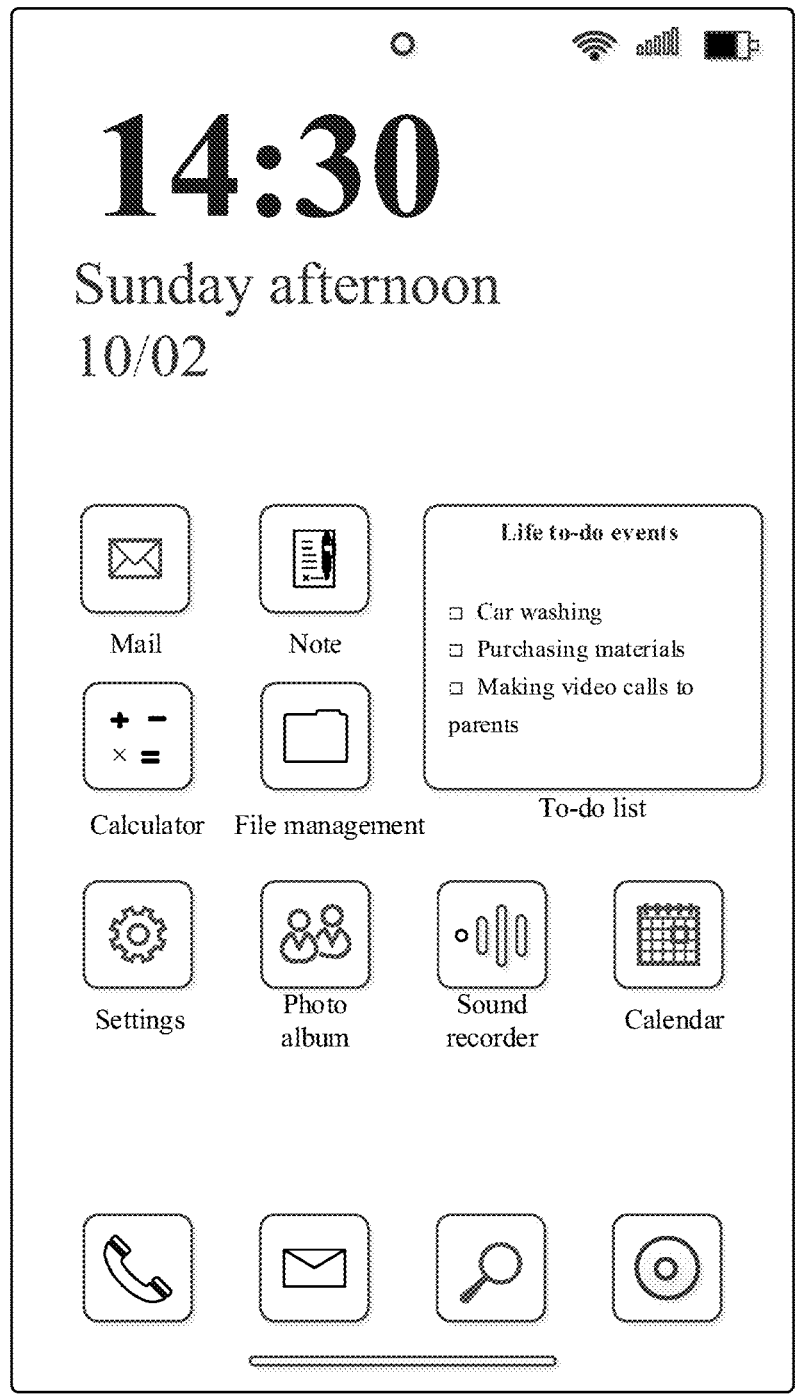
FIG. 8B is a diagram of another user interface according to an example.

FIG. 8B is a diagram of another user interface according to an example, as shown in FIG. 8B, after a user returns home from the company, the terminal device can detect that the current location changes to be at home, the display content of the to-do widget changes to life to-do events, to-do events to be displayed can be determined according to the current time of 2:30 p.m. on Sunday: car washing, purchasing materials, and making video calls to parents.

The three work to-do events displayed by the to-do widget may be three to-do events of which the deadline is closest to the current time among the work to-do events, and the three life to-do events displayed by the to-do widget may be three to-do events of which the deadline is closest to the current time among the life to-do events.

In another possible implementation, the widget is a logistics widget, the step S32 of obtaining the display content of the widget corresponding to the second location as the first display content when the current location is changed from the first location to the second location may include:

obtaining a third number of logistics information of parcels not picked up with the second location as a delivery address as the first display content when the current location is changed from the first location to the second location, where the third number is determined according to a size of the widget.

Further, obtaining the logistics information of the parcels not picked up with the second location as the delivery address as the first display content may include:

obtaining a third number of logistics information of parcels not picked up with an earliest arrival time among all logistics information of the parcels not picked up as the first display content.

For example, when the terminal device is located at a home, a display content of the logistics widget may be information of parcels to be picked up in a parcel pickup site of a community where the home is located; and when the terminal device is located in a working place, the display content of the logistics widget may be changed to information of parcels to be picked up in a parcel pickup site to which a company address corresponds, and information of parcels to be picked up with an earliest arrival time may be preferentially displayed.

In another possible implementation, the scene information includes weather information, the step S12 of obtaining the first display content of the widget corresponding to the changed scene information in the case where the scene information is changed may include:

obtaining related information of the set weather event as the first display content the weather information indicates that a set weather event occurs at a location where the terminal device is located.

It can be understood that the set weather event may be weather such as rainfall, snowfall, and typhoon, e.g., when it rains at the current location, the weather widget displays information related to the current rainfall, such as the type of rainfall being torrential rain, precipitation, and how long it is expected to stop raining.

Figure 9:
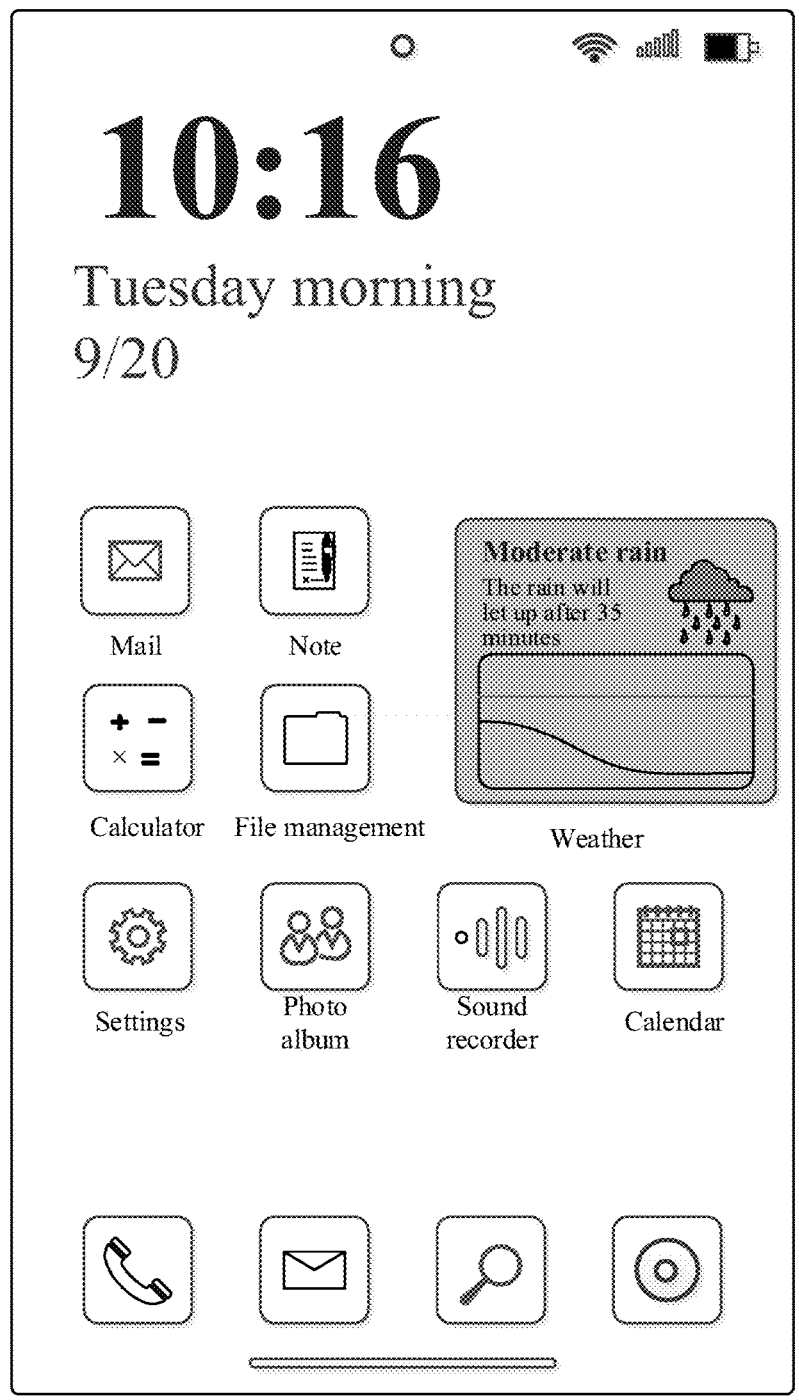
FIG. 9 is a diagram of a user interface according to an example.

FIG. 9 is a diagram of a user interface according to an example, as shown in FIG. 9, in case of rain, a display content of the weather widget is: moderate rain at this time; it is expected that the rain will gradually decrease after 35 minutes; and a precipitation curve during rainfall.

In the above technical solution, the scene information of the terminal device is first detected, the first display content of the widget corresponding to the changed scene information is obtained in the case where the scene information is changed, and then the display content of the widget is updated from the second display content currently displayed to the first display content. With the above-described implementations, the display content of the widget can be changed under different scene information, the diversity and flexibility of the display content of the widget can be increased, the efficiency of information transmission can be increased, and the needs of users to obtain information in a plurality of scenes can be met.

In some examples, the widget provided in the examples of the disclosure is moveable, and in one implementation, the method for displaying a widget may further include the following steps of:

making the widget enter a moveable state in response to a first setting operation for the widget;
moving the widget according to a drag operation performed on the widget; and
making the widget exit from the moveable state in response to a situation that a duration during which the widget stops moving reaches a set duration, or in response to a movement completion instruction.

Figure 10:
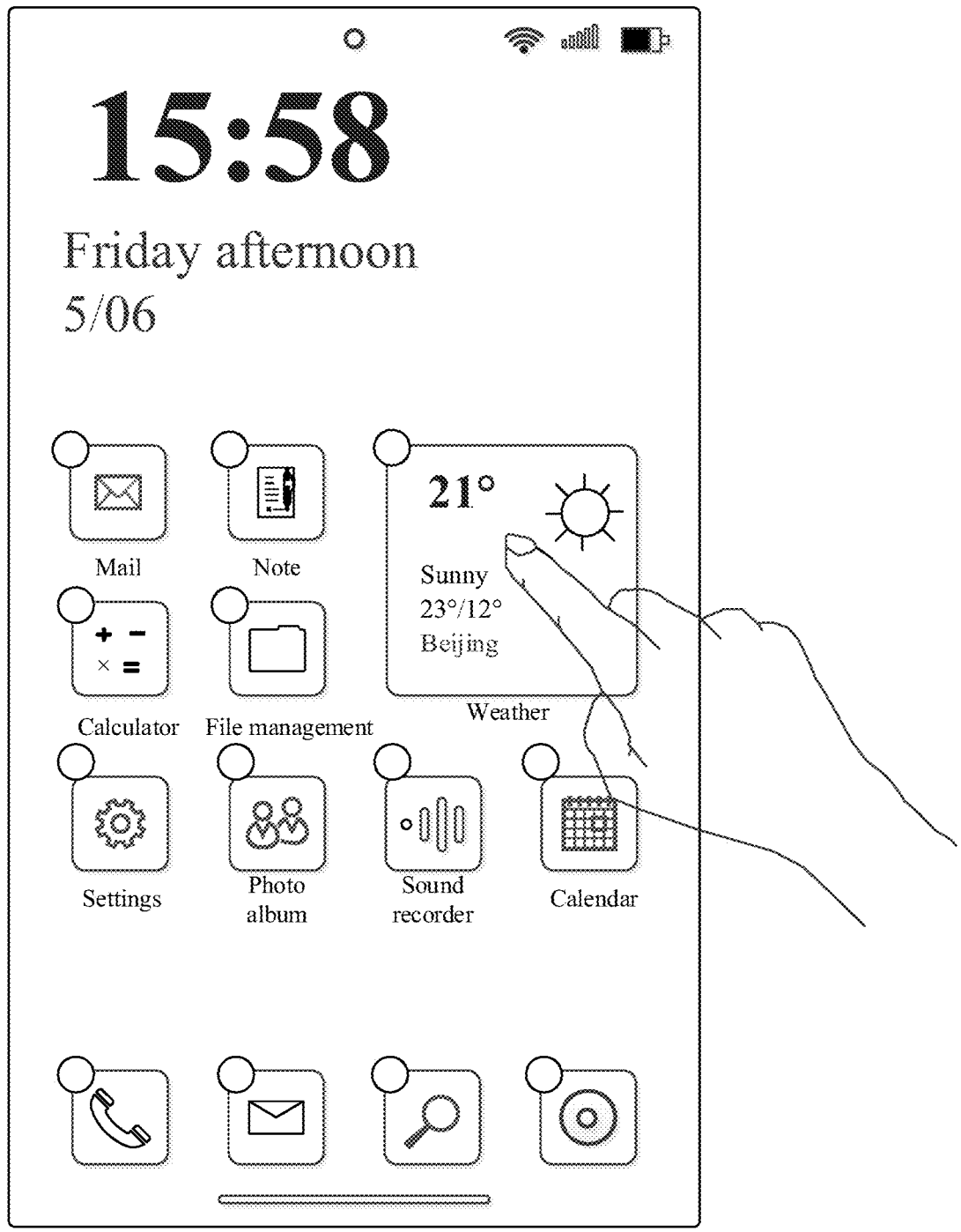
FIG. 10 is a schematic diagram of a method for displaying a widget according to an example.

It can be understood that a location of the widget on a terminal desktop can be set independently according to the needs of users, for example, the first setting operation described above may be a long press operation at any position of the desktop to make the widget enter the moveable state. FIG. 10 is a schematic diagram of a method for displaying a widget according to an example, as shown in FIG. 10, after the widget enters the moveable state, the widget may be subjected to a drag operation on the desktop, and the widget may exit from the moveable state when the duration during which the widget stops moving reaches the set duration, e.g., 3s, or a movement completion instruction is received.

In some examples, a widget display window may also be expanded, and in one implementation, the method for displaying a widget may further include:

in response to a second setting operation for the widget, displaying an information window on the widget, where the information window is configured to display other contents except the first display content.

Figure 11:
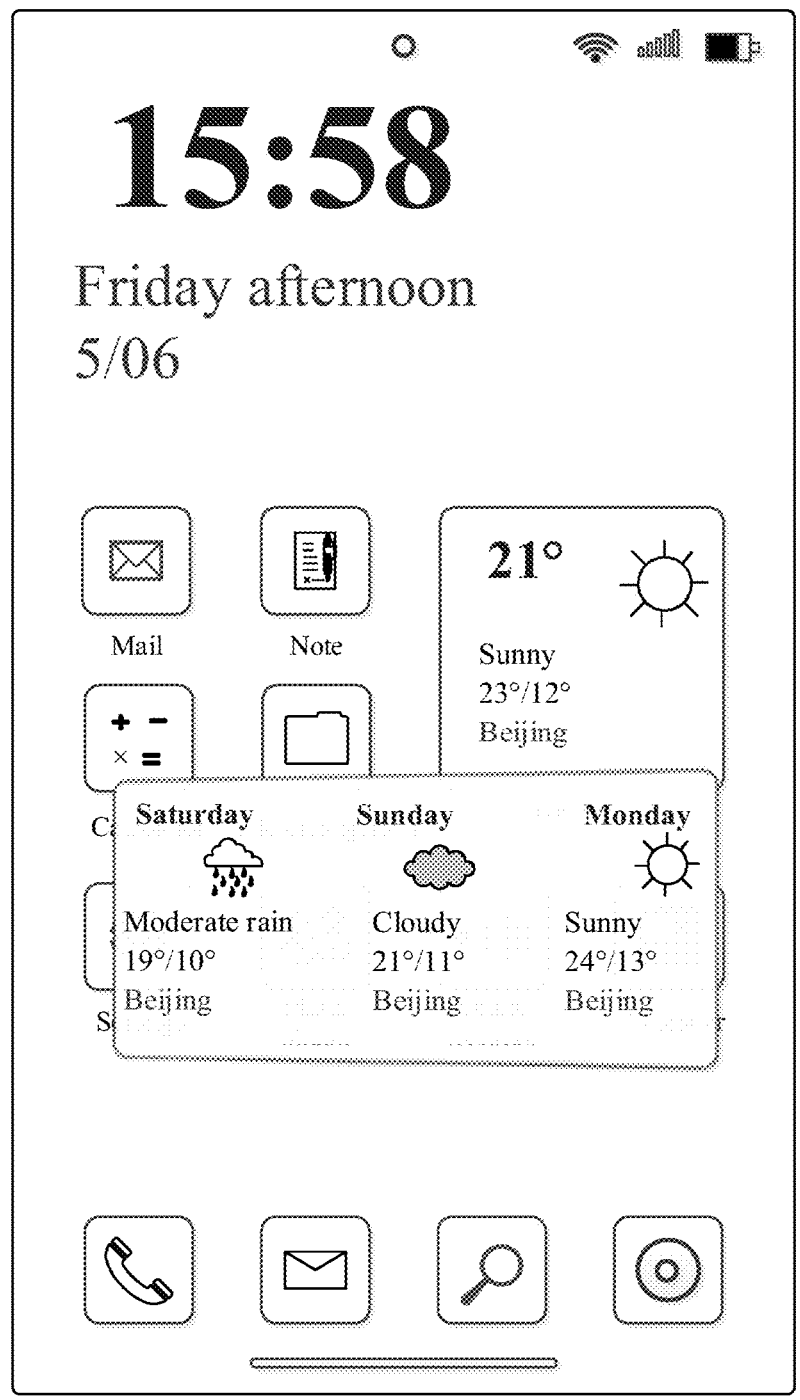
FIG. 11 is a schematic diagram of a method for displaying a widget according to an example.

For example, the second setting operation may be double clicking the widget, and after double clicking, the information window is displayed on the widget. FIG. 11 is a schematic diagram of a method for displaying a widget according to an example, as shown in FIG. 11, the widget may be a weather widget, and after double clicking the weather widget, an information window may be popped up to display the weather in the next three days. In another example, the widget may be a to-do widget, and after double clicking the widget, a to-do list may be popped up.

In some examples, a display state of the widget may also be adjusted, and in one implementation, the method may further include:

in response to a third setting operation for the widget, switching the widget to a display state corresponding to the third setting operation. The display state may include a floating display state and a size of the widget.

For example, the third setting operation is a click operation, the widget is switched to the floating display state, and the floating display state may be understood as a layer where the widget is displayed on the upper layer of the desktop. In the floating display state, the widget can move freely with the drag of the user in the display interface, and the desktop is not affected during the moving process of the widget. The click operation may be a single click, a multi-click, a long press, or a pressure touch operation, which is not limited in the disclosure.

Or, the third setting operation is a scaling operation, the widget is adjusted to an enlarged size or a reduced size, where the enlarged size or reduced size corresponds to a scale of the scaling operation.

Figure 12:
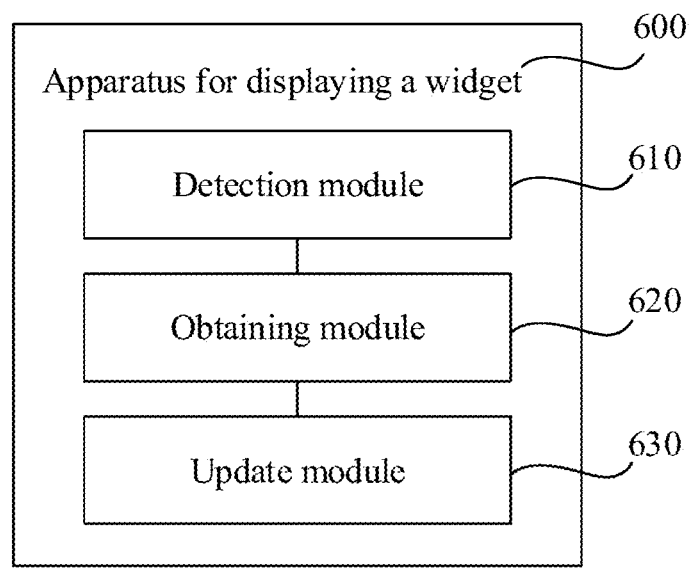
FIG. 12 is a block diagram of an apparatus for displaying a widget according to an example.

FIG. 12 is a block diagram of an apparatus 600 for displaying a widget according to an example. In some instances, the apparatus 600 is a terminal device. The apparatus 600 may include a detection module 610, an obtaining module 620, and an update module 630.

The detection module 610 is configured to detect scene information of the terminal device;
the obtaining module 620 is configured to obtain a first display content of the widget corresponding to the changed scene information the scene information is changed; and
the update module 630 is configured to update a display content of the widget from a second display content currently displayed to the first display content.

In some examples, the obtaining module 620 includes an obtaining sub-module; and when the scene information is a current time, the obtaining sub-module is configured to:

obtain a display content corresponding to the set time range as the first display content the current time enters a set time range.

In some examples, the widget is a weather widget, the obtaining sub-module is further configured to:

obtain weather information within a future set time as the first display content the current time enters the set time range.

In some examples, the widget is a to-do widget, the obtaining sub-module is further configured to:

obtain a first number of to-do events within a future set time as the first display content in the case where the current time enters the set time range, where the first number is determined according to a size of the widget.

In some examples, the obtaining module 620 further includes a processing sub-module; and the scene information is a current time, and the widget is a to-do widget, the processing sub-module is configured to:

perform visual style enhancement processing on reminding information of the first to-do event in a case where a time difference between the current time and a target time of a first to-do event in the to-do widget is less than a set time difference to obtain visual style enhanced reminding information as the first display content;

where the first to-do event is a to-do event in the to-do widget.

In some examples, the scene information is a current location, the obtaining sub-module is further configured to:

obtain a display content of the widget corresponding to the second location as the first display content when the current location is changed from a first location to a second location.

In some examples, the widget is a weather widget, the obtaining sub-module is further configured to:

obtain weather information of a region to which the second location belongs as the first display content when the current location is changed from the first location to the second location.

In some examples, the widget is a to-do widget, the obtaining sub-module is further configured to:

obtain a time type of the current time when the current location is changed from the first location to the second location; and obtain a second number of to-do events corresponding to the second location as the first display content the time type of the current time is a time type corresponding to the second location, where the second number is determined according to a size of the widget.

In some examples, the obtaining sub-module is further configured to:

obtain a second number of work to-do events with a highest priority among work to-do events as the first display content in a case where a place to which the second location corresponds is an office place, and the current time is a working day; and obtain a second number of life to-do events with a highest priority among life to-do events as the first display content in a case where a place to which the second location corresponds is a home, and the current time is a rest day.

In some examples, the widget is a logistics widget, the obtaining sub-module is further configured to:

obtain a third number of logistics information of parcels not picked up with the second location as a delivery address as the first display content when the current location is changed from the first location to the second location, where the third number is determined according to a size of the widget.

In some examples, the obtaining sub-module is further configured to:

obtain a third number of logistics information of parcels not picked up with an earliest arrival time among all logistics information of the parcels not picked up as the first display content.

In some examples, the scene information includes weather information, the obtaining sub-module is further configured to:

obtain related information of the set weather event as the first display content the weather information indicates that a set weather event occurs at a location where the terminal device is located.

In the above technical solution, the scene information of the terminal device is first detected, the first display content of the widget corresponding to the changed scene information is obtained in the case where the scene information is changed, and then the display content of the widget is updated from the second display content currently displayed to the first display content. With the above-described implementations, the display content of the widget can be changed under different scene information, the diversity and flexibility of the display content of the widget can be increased, the efficiency of information transmission can be increased, and the needs of users to obtain information in a plurality of scenes can be met.

According to the device in the above example, a specific mode for each module to execute operation has been described in detail in the example of the method, and will not be described in detail here.

The disclosure also provides a computer readable storage medium having computer program instructions stored, where when the program instructions are executed by a processor, the steps of the method for displaying a widget provided by the disclosure are implemented.

Figure 13:
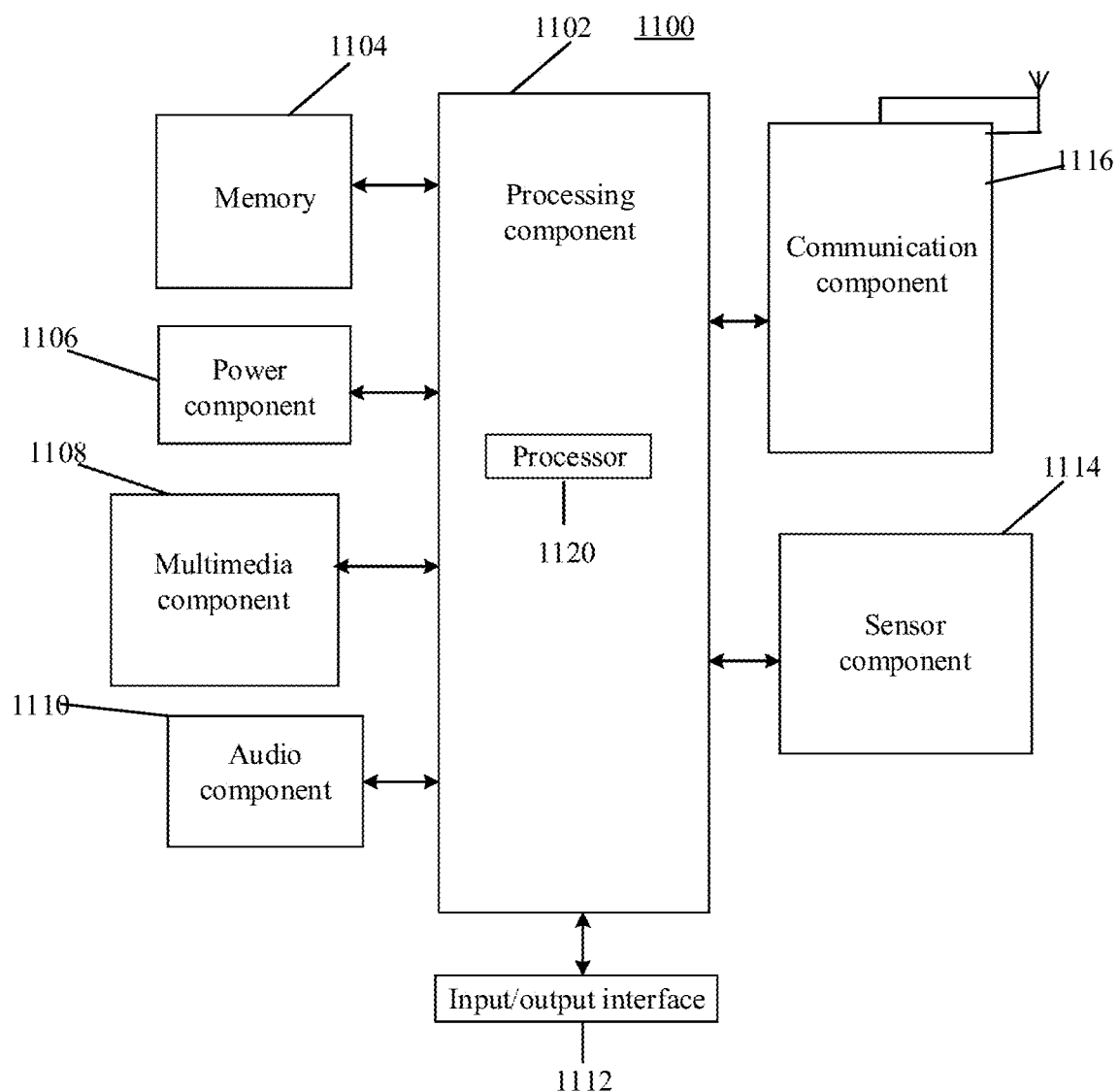
FIG. 13 is a block diagram of an apparatus for displaying a widget according to an example.

FIG. 13 is a block diagram of an apparatus 1100 for displaying a widget according to an example. For example, the device 1100 may be a mobile phone, a computer, a digital broadcast terminal, a messaging device, a game console, a tablet device, a medical device, a fitness device, a personal digital assistant, etc.

Referring to FIG. 13, the device 1100 may include one or more of the following components: a processing component 1102, a memory 1104, a power supply component 1106, a multimedia component 1108, an audio component 1110, an input/output interface 1112, a sensor component 1114, and a communication component 1116.

The processing component 1102 typically controls the overall operations of the device 1100, such as operations associated with display, telephone calls, data communications, camera operations, and recording operations. The processing component 1102 can include one or more processors 1120 to execute instructions to complete all or part of the steps of the method for displaying a widget described above. Further, the processing component 1102 may include one or more modules, facilitating interaction between the processing component 1102 and other components. For example, the processing component 1102 may include a multimedia module to facilitate interaction between the multimedia component 1108 and the processing component 1102.

The memory 1104 is configured to store various types of data to support operation at the device 1100. Examples of these data include instructions, contact data, phonebook data, messages, pictures, video, etc., for any application or method operating on the device 1100. The memory 1104 may be implemented by any type of volatile or non-volatile storage device or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 1106 provides power for the various components of the device 1100. The power supply component 1106 may include a power management system, one or more power supplies, and other components associated with generating, managing and distributing power for the device 1100.

The multimedia component 1108 includes a screen that provides an output interface between the device 1100 and a user. In some examples, the screen may include a liquid crystal display (LCD) and a touch panel (TP). If the screen includes the touch panel, the screen may be implemented as a touch screen to receive an input signal from a user. The touch panel includes one or more touch sensors to sense touches, slides, and gestures on the touch panel. The touch sensor may not only sense a boundary of a touch or slide action, but also detect duration and pressure associated with the touch or slide action. In some examples, the multimedia component 1108 includes a front camera and/or a rear camera. When the device 1100 is in an operation mode, such as a shooting mode or a video mode, the front camera and/or the rear camera can receive external multimedia data. Each front camera and each rear camera may be a fixed optical lens system or have a focal length and optical zoom capability.

The audio component 1110 is configured to output and/or input audio signals. For example, the audio component 810 includes a microphone (MIC) configured to receive an external audio signal when the device 1100 is in operating mode, such as a call mode, a recording mode, and a voice recognition mode. The received audio signal may be further stored in the memory 1104 or transmitted via the communication component 1116. In some examples, the audio component 1110 also includes a speaker configured to output audio signals.

The input/output interface 1112 provides an interface between the processing component 1102 and a peripheral interface module, and the peripheral interface module may be a keyboard, a click wheel, a button, or the like. These buttons may include, but are not limited to, a homepage button, a volume button, a start button, and a lock button.

The sensor component 1114 includes one or more sensors for providing various aspects of state evaluation for the device 1100. For example, the sensor component 1114 may detect an open/closed state of the device 1100, relative positioning of the components, such as a display and a keypad of the device 1100, and may also detect a change in position of the device 1100 or one component of the device 1100, the presence or absence of contact of a user with the device 1100, the orientation or acceleration/deceleration of the device 1100, and a temperature change of the device 1100. The sensor component 1114 may include a proximity sensor configured to detect the presence of a nearby object without any physical contact. The sensor component 1114 may also include a light sensor, such as a CMOS or CCD image sensor, for use in imaging applications. In some examples, the sensor component 1114 may further include an acceleration sensor, a gyroscope sensor, a magnetic sensor, a pressure sensor, or a temperature sensor.

The communication component 1116 is configured to facilitate wired or wireless communication between the device 1100 and other devices. The device 1100 can access a wireless network based on a communication standard, such as WiFi, 2G or 3G, or their combinations. In one example, the communication component 1116 receives a broadcast signal or broadcast related information from an external broadcast management system via a broadcast channel. In an example, the communication component 1116 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the device 1100 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components for performing the method for displaying a widget described above.

In an example, a non-transitory computer readable storage medium including instructions is also provided, such as the memory 1104 including instructions, and the instructions may be executed by the processor 1120 of the device 1100 to perform the method for displaying a widget described above. For example, the non-transitory computer readable storage medium may be a read-only memory (ROM), a random access memory (RAM), CD-ROM, a magnetic tape, a floppy disk, an optical data storage device, or the like.

The above device may be a separate electronic device, or may be part of a separate electronic device, for example, in one example, the device may be an integrated circuit (IC) or a chip, where the integrated circuit may be one IC or a collection of a plurality of ICs; the chip may include, but is not limited to, the following categories: GPU (Graphics Processing Unit), CPU (Central Processing Unit), FPGA (Field Programmable Gate Array), DSP (Digital Signal Processor), ASIC (Application Specific Integrated Circuit), SOC (System on Chip, SoC), etc. The integrated circuit or chip described above can be used to execute executable instructions (or codes) to implement the method for displaying a widget described above. The executable instructions may be stored in the integrated circuit or chip, or obtained from other apparatuses or devices. For example, the integrated circuit or chip includes a processor, a memory, and an interface for communicating with other devices. The executable instructions may be stored in the memory, when the executable instructions are executed by the processor, the method for displaying a widget described above is implemented; or, the integrated circuit or chip may receive executable instructions via the interface and transmit the executable instructions to the processor for execution to implement the method for displaying a widget described above.

In another example, there is also provided a computer program product including a computer program executable by a programmable device, the computer program having a code portion for performing the method for displaying a widget described above when executed by the programmable device.

Those skilled in the art will easily think of other examples of the disclosure after taking into account the description and practicing the disclosure. The disclosure is intended to cover any variations, uses, or adaptive changes of the disclosure, and these variations, uses, or adaptive changes follow the general principles of the disclosure and include the common general knowledge or conventional technical means in the technical field not disclosed in the disclosure. The description and examples are considered as illustrative only, and the true scope and spirit of the disclosure are indicated by the following claims.

It should be understood that the disclosure is not limited to the precise structures that have been described above and shown in the accompanying drawings, and that various modifications and changes can be made without departing from the scope. The scope of the disclosure is limited only by the appended claims.

According to a first aspect of the examples of the disclosure, provided is a method for displaying a widget performed by a terminal device, where the method includes:
  detecting scene information of the terminal device;
  obtaining a first display content corresponding to changed scene information the scene information is changed; and
  updating a display content of the widget from a second display content currently displayed to the first display content.

In some examples, the scene information is a current time, and obtaining the first display content of the widget corresponding to the changed scene information in the case where the scene information is changed includes:
  obtaining a display content corresponding to a set time range as the first display content the current time enters the set time range.

In some examples, the widget is a weather widget, and obtaining the display content corresponding to the set time range as the first display content in the case where the current time enters the set time range includes:
  obtaining weather information within a future set time as the first display content the current time enters the set time range.

In some examples, the widget is a to-do widget, and obtaining the display content corresponding to the set time range as the first display content in the case where the current time enters the set time range includes:
  obtaining a first number of to-do events within a future set time as the first display content in the case where the current time enters the set time range, where the first number is determined according to a size of the widget.

In some examples, the scene information is a current time, the widget is a to-do widget, and obtaining the first display content of the widget corresponding to the changed scene information in the case where the scene information is changed includes:
  obtaining visual style enhanced reminding information as the first display content by performing visual style enhancement processing on reminding information of a first to-do event in a case where a time difference between the current time and a target time of the first to-do event in the to-do widget is less than a set time difference;
  where the first to-do event is a to-do event in the to-do widget.

In some examples, the scene information is a current location, and obtaining the first display content of the widget corresponding to the changed scene information in the case where the scene information is changed includes:
  obtaining a display content of the widget corresponding to the second location as the first display content when the current location is changed from a first location to a second location.

In some examples, the widget is a weather widget, and obtaining the display content of the widget corresponding to the second location as the first display content when the current location is changed from the first location to the second location includes:
  obtaining weather information of a region to which the second location belongs as the first display content when the current location is changed from the first location to the second location.

In some examples, the widget is a to-do widget, obtaining the display content of the widget corresponding to the second location as the first display content when the current location is changed from the first location to the second location includes:
  obtaining a time type of the current time when the current location is changed from the first location to the second location; and
  obtaining a second number of to-do events corresponding to the second location as the first display content the time type of the current time is a time type corresponding to the second location, where the second number is determined according to a size of the widget.

In some examples, obtaining the second number of the to-do events corresponding to the second location as the first display content in the case where the time type of the current time is the time type corresponding to the second location includes:
  obtaining a second number of work to-do events with a highest priority among work to-do events as the first display content in a case where a place to which the second location corresponds is an office place, and the current time is a working day; and
  obtaining a second number of life to-do events with a highest priority among life to-do events as the first display content in a case where a place to which the second location corresponds is a home, and the current time is a rest day.

In some examples, the widget is a logistics widget, obtaining the display content of the widget corresponding to the second location as the first display content when the current location is changed from the first location to the second location includes:
  obtaining a third number of logistics information of parcels not picked up with the second location as a delivery address as the first display content when the current location is changed from the first location to the second location, where the third number is determined according to a size of the widget.

In some examples, obtaining the logistics information of the parcels not picked up with the second location as the delivery address as the first display content includes:
  obtaining a third number of logistics information of parcels not picked up with an earliest arrival time among all logistics information of the parcels not picked up as the first display content.

In some examples, the scene information includes weather information, obtaining the first display content of the widget corresponding to the changed scene information in the case where the scene information is changed includes:
  obtaining related information of the set weather event as the first display content the weather information indicates that a set weather event occurs at a location where the terminal device is located.

In some examples, the method further includes;
  making the widget enter a moveable state in response to a first setting operation for the widget;
  moving the widget according to a drag operation performed on the widget; and
  making the widget exit from the moveable state in response to a situation that a duration during which the widget stops moving reaches a set duration, or in response to a movement completion instruction.

In some examples, the method further includes;

in response to a second setting operation for the widget, displaying an information window on the widget, where the information window is configured to display other contents except the first display content.

In some examples, the method further includes;

in response to a third setting operation for the widget, switching the widget to a display state corresponding to the third setting operation.

In some examples, switching the widget to the display state corresponding to the third setting operation includes:

switching the widget to a floating display state the third setting operation is a click operation; or, adjusting the widget to an enlarged size or a reduced size the third setting operation is a scaling operation, where the enlarged size or the reduced size corresponds to a scale of the scaling operation.

According to a second aspect of the examples of the disclosure, provided is an apparatus for displaying a widget applied to a terminal device, where the device includes:

a detection module, configured to detect scene information of the terminal device;

an obtaining module, configured to obtain a first display content of the widget corresponding to the changed scene information the scene information is changed; and an update module, configured to update a display content of the widget from a second display content currently displayed to the first display content.

The technical solutions provided by the examples of the disclosure may include the following beneficial effects:

In the above technical solution, the scene information of the terminal device is first detected, the first display content of the widget corresponding to the changed scene information is obtained in the case where the scene information is changed, and then the display content of the widget is updated from the second display content currently displayed to the first display content. With the above-described implementations, the display content of the widget can be changed in different scenes, the diversity and flexibility of the display content of the widget can be increased, the efficiency of information transmission can be increased, and the needs of users to obtain information in a plurality of scenes can be met.

What is claimed is:

1. A method for displaying a widget, wherein the method is performed by a terminal device, and comprises:
   detecting scene information of the terminal device;
   obtaining a first display content corresponding to changed scene information in a case where the scene information is changed; and
   updating a display content of the widget from a second display content currently displayed to the first display content;
   wherein:
   the scene information comprises a current location;
   obtaining the first display content corresponding to the changed scene information in the case where the scene information is changed comprises:
   obtaining a display content of the widget corresponding to a second location as the first display content in response to determining that the current location is changed from a first location to the second location; and
   the widget comprises a to-do widget, and obtaining the display content of the widget corresponding to the second location as the first display content in response to determining that the current location is changed from the first location to the second location comprises:
   obtaining a time type of a current time in response to determining that the current location is changed from the first location to the second location, wherein the scene information further comprises the current time; and
   obtaining a second number of to-do events corresponding to the second location as the first display content the time type of the current time is the time type corresponding to the second location, wherein the second number is determined according to a size of the widget; or
   the widget comprises a logistics widget, and obtaining the display content of the widget corresponding to the second location as the first display content in response to determining that the current location is changed from the first location to the second location comprises:
   obtaining a third number of logistics information of parcels not picked up with the second location as a delivery address as the first display content in response to determining that the current location is changed from the first location to the second location, wherein the third number is determined according to a size of the widget.

2. The method according to claim 1, wherein the scene information further comprises the current time, and obtaining the first display content corresponding to the changed scene information in the case where the scene information is changed further comprises:
   obtaining a display content corresponding to a set time range as the first display content in a case where the current time enters the set time range.

3. The method according to claim 2, wherein the widget further comprises a weather widget, and obtaining the display content corresponding to the set time range as the first display content in the case where the current time enters the set time range comprises:
   obtaining weather information within a future set time as the first display content the current time enters the set time range.

4. The method according to claim 2, wherein the widget further comprises the to-do widget, and obtaining the display content corresponding to the set time range as the first display content in the case where the current time enters the set time range comprises:
   obtaining a first number of to-do events within a future set time as the first display content in the case where the current time enters the set time range, wherein the first number is determined according to a size of the widget.

5. The method according to claim 1, wherein the scene information further comprises the current time, the widget comprises the to-do widget, and obtaining the first display content corresponding to the changed scene information in the case where the scene information is changed further comprises:
   obtaining visual style enhanced reminding information as the first display content by performing visual style enhancement processing on reminding information of a first to-do event in a case where a time difference between the current time and a target time of the first to-do event in the to-do widget is less than a set time difference;
   wherein the first to-do event is a to-do event in the to-do widget.

6. The method according to claim 1, wherein the widget further comprises a weather widget, and obtaining the display content of the widget corresponding to the second location as the first display content in response to determining that the current location is changed from the first location to the second location further comprises:
obtaining weather information of a region to which the second location belongs as the first display content in response to determining that the current location is changed from the first location to the second location.

7. The method according to claim 1, wherein obtaining the second number of the to-do events corresponding to the second location as the first display content in the case where the time type of the current time is the time type corresponding to the second location comprises:
obtaining a second number of work to-do events with a highest priority among work to-do events as the first display content in a case where a place to which the second location corresponds is an office place, and the current time is a working day; and
obtaining a second number of life to-do events with a highest priority among life to-do events as the first display content in a case where a place to which the second location corresponds is a home, and the current time is a rest day.

8. The method according to claim 1, wherein obtaining the logistics information of the parcels not picked up with the second location as the delivery address as the first display content comprises:
obtaining a third number of logistics information of parcels not picked up with an earliest arrival time among all logistics information of the parcels not picked up as the first display content.

9. The method according to claim 1, wherein the scene information comprises weather information, obtaining the first display content of the widget corresponding to the changed scene information in the case where the scene information is changed further comprises:
obtaining related information of a set weather event as the first display content the weather information indicates that the set weather event occurs at a location where the terminal device is located.

10. The method according to claim 1, further comprising:
making the widget enter a moveable state in response to a first setting operation for the widget;
moving the widget according to a drag operation performed on the widget; and
making the widget exit from the moveable state in response to a situation that a duration during which the widget stops moving reaches a set duration, or in response to a movement completion instruction.

11. The method according to claim 1, further comprising:
switching the widget to a display state corresponding to a third setting operation in response to the third setting operation for the widget.

12. The method according to claim 11, wherein switching the widget to the display state corresponding to the third setting operation comprises:
switching the widget to a floating display state the third setting operation is a click operation; or,
adjusting the widget to an enlarged size or a reduced size the third setting operation is a scaling operation, wherein the enlarged size or the reduced size corresponds to a scale of the scaling operation.

13. The method according to claim 1, further comprising:
displaying an information window on the widget in response to a second setting operation for the widget, wherein the information window is configured to display other contents except the first display content.

14. An apparatus for displaying a widget, comprising:
a processor; and
a memory, configured to store processor executable instructions;
wherein the processor is configured to:
detect scene information of a terminal device;
obtain a first display content corresponding to changed scene information in a case where the scene information is changed; and
update a display content of the widget from a second display content currently displayed to the first display content;
wherein:
the scene information comprises a current location; and
the widget comprises a to-do widget, and the processor is further configured to:
obtain a time type of a current time in response to determining that the current location is changed from a first location to a second location, wherein the scene information further comprises the current time; and
obtain a second number of to-do events corresponding to the second location as the first display content the time type of the current time is the time type corresponding to the second location, wherein the second number is determined according to a size of the widget; or
the widget comprises a logistics widget, and the processor is further configured to:
obtain a third number of logistics information of parcels not picked up with a second location as a delivery address as the first display content in response to determining that the current location is changed from a first location to the second location, wherein the third number is determined according to a size of the widget.

15. The apparatus according to claim 14, wherein the scene information further comprises the current time, and the processor is configured to:
obtain a display content corresponding to a set time range as the first display content in a case where the current time enters the set time range.

16. The apparatus according to claim 15, wherein the widget is further comprises a weather widget, and the processor is configured to:
obtain weather information within a future set time as the first display content the current time enters the set time range.

17. The apparatus according to claim 14, wherein the processor is further configured to:
display an information window on the widget in response to a second setting operation for the widget, wherein the information window is configured to display other contents except the first display content.

18. A non-transitory computer readable storage medium having computer program instructions for displaying a widget stored thereon, wherein the computer program instructions when executed by a processor, cause the processor to execute a method comprising:
detecting scene information of a terminal device;
obtaining a first display content corresponding to changed scene information in a case where the scene information is changed; and
updating a display content of the widget from a second display content currently displayed to the first display content;
wherein:

the scene information comprises a current location, and obtaining the first display content corresponding to the changed scene information in the case where the scene information is changed comprises:

obtaining a display content of the widget corresponding to a second location as the first display content in response to determining that the current location is changed from a first location to the second location; and the widget comprises a to-do widget, and obtaining the display content of the widget corresponding to the second location as the first display content in response to determining that the current location is changed from the first location to the second location comprises:

obtaining a time type of a current time in response to determining that the current location is changed from the first location to the second location, wherein the scene information further comprises the current time; and obtaining a second number of to-do events corresponding to the second location as the first display content the time type of the current time is the time type corresponding to the second location, wherein the second number is determined according to a size of the widget; or the widget comprises a logistics widget, and obtaining the display content of the widget corresponding to the second location as the first display content in response to determining that the current location is changed from the first location to the second location comprises:

obtaining a third number of logistics information of parcels not picked up with the second location as a delivery address as the first display content in response to determining that the current location is changed from the first location to the second location, wherein the third number is determined according to a size of the widget.

19. The method according to claim 18, wherein the computer program instructions when executed by the processor, cause the processor to execute a method further comprising:

displaying an information window on the widget in response to a second setting operation for the widget, wherein the information window is configured to display other contents except the first display content.

* * * * *